United States Patent [19]

Moorehead

[11] 4,252,286
[45] Feb. 24, 1981

[54] SIMPLIFIED CORE FLOW THRUST CONTROL DEVICE

[75] Inventor: James R. Moorehead, Bellevue, Wash.

[73] Assignee: The Boeing Company, Seattle, Wash.

[21] Appl. No.: 30,266

[22] Filed: Apr. 16, 1979

[51] Int. Cl.³ .......................... B64C 15/00; F02K 1/54
[52] U.S. Cl. .................................. 244/110 B; 60/230; 239/265.19; 244/12.5
[58] Field of Search .................... 244/12.5, 23 D, 1 N, 244/52, 110 B; 239/265.19, 265.13, 507, 512; 60/226 A, 230

[56] References Cited

U.S. PATENT DOCUMENTS

| 2,654,552 | 10/1953 | Jonas . | |
|---|---|---|---|
| 2,696,079 | 12/1954 | Kappus . | |
| 2,879,642 | 3/1959 | Hiatt et al. | 244/110 B |
| 3,013,751 | 12/1961 | Scott et al. | 244/110 B |
| 3,055,174 | 9/1962 | Grotz et al. | 239/265.13 |
| 3,273,654 | 9/1966 | Pinnes . | |
| 3,292,864 | 12/1966 | Edkins . | |
| 3,292,880 | 12/1966 | Kutney . | |
| 3,478,988 | 11/1969 | Roed . | |
| 3,677,501 | 7/1972 | Denning . | |
| 3,730,960 | 5/1973 | Mederer . | |
| 3,731,489 | 5/1973 | Monaghan et al. . | |
| 3,833,187 | 9/1974 | Kahler et al. . | |
| 4,000,611 | 1/1977 | McCardle et al. . | |

Primary Examiner—Charles E. Frankfort
Attorney, Agent, or Firm—Ronald E. Suter; Bernard A. Donahue

[57] ABSTRACT

There is disclosed a simplified, lightweight, easily stowed thrust control device for the hot core exhaust flow of a jet engine. The device is mounted in the engine strut fairing, downstream of the nozzle exit plane to reduce exposure to the high exhaust temperatures. In a blocking position, the mounting hardware, actuator and actuator linkage is located so as to be cooled by both free stream and fan air, providing a longer operating life, less maintenance and more reliable operation. Simplified construction and mounting arrangement permit the device to be readily retrofitted on existing installations.

7 Claims, 6 Drawing Figures

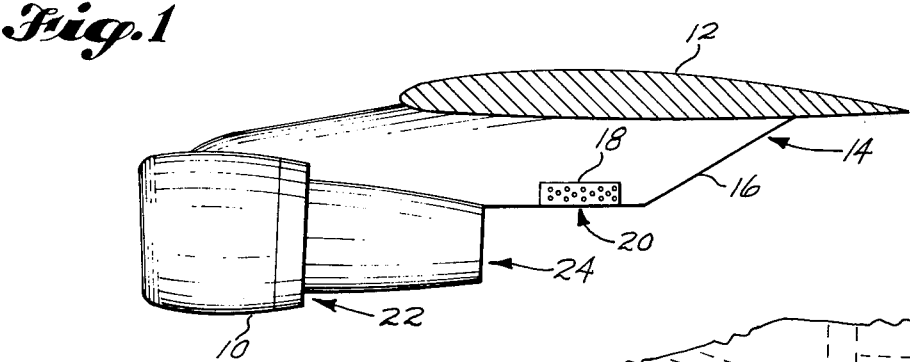
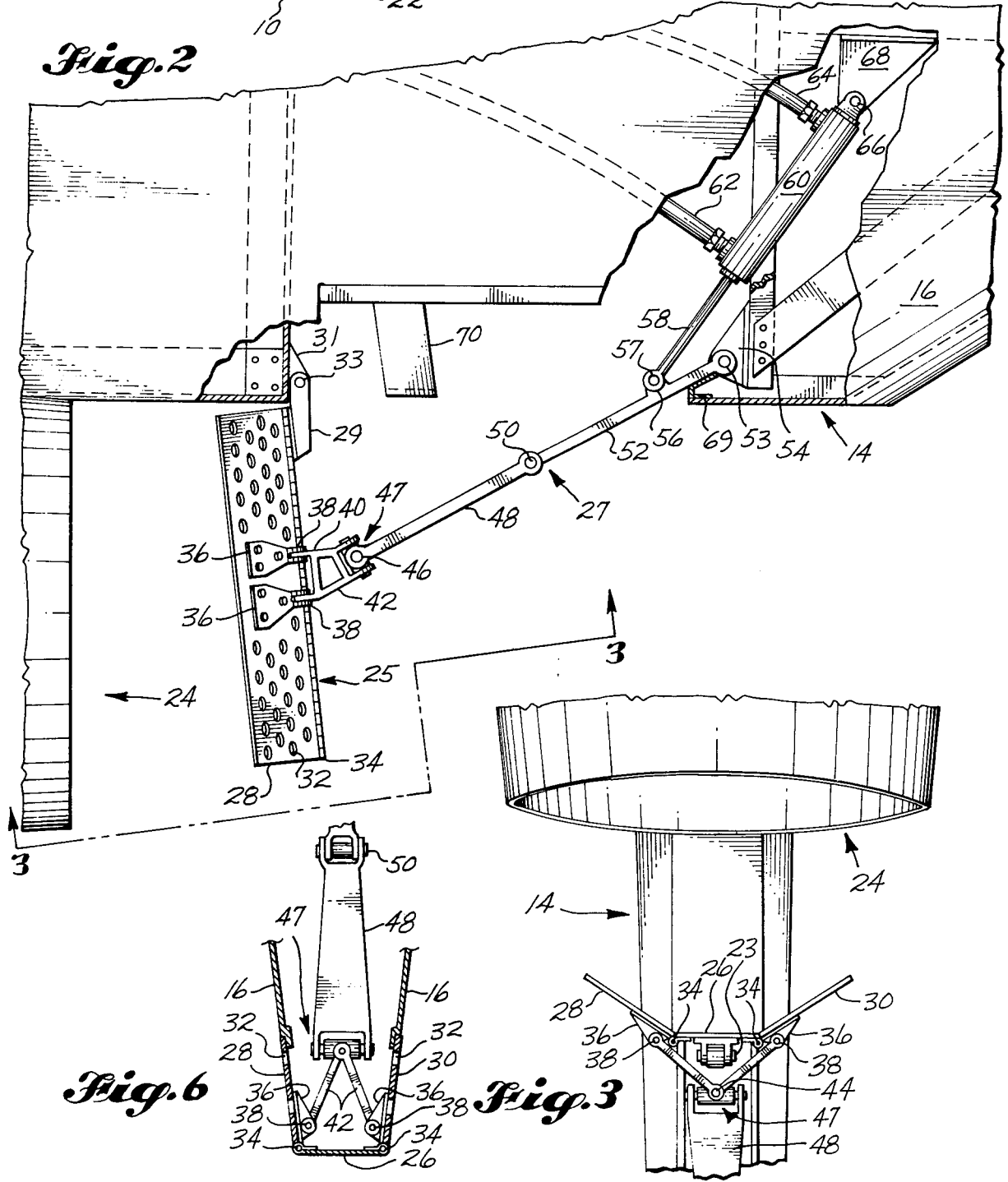

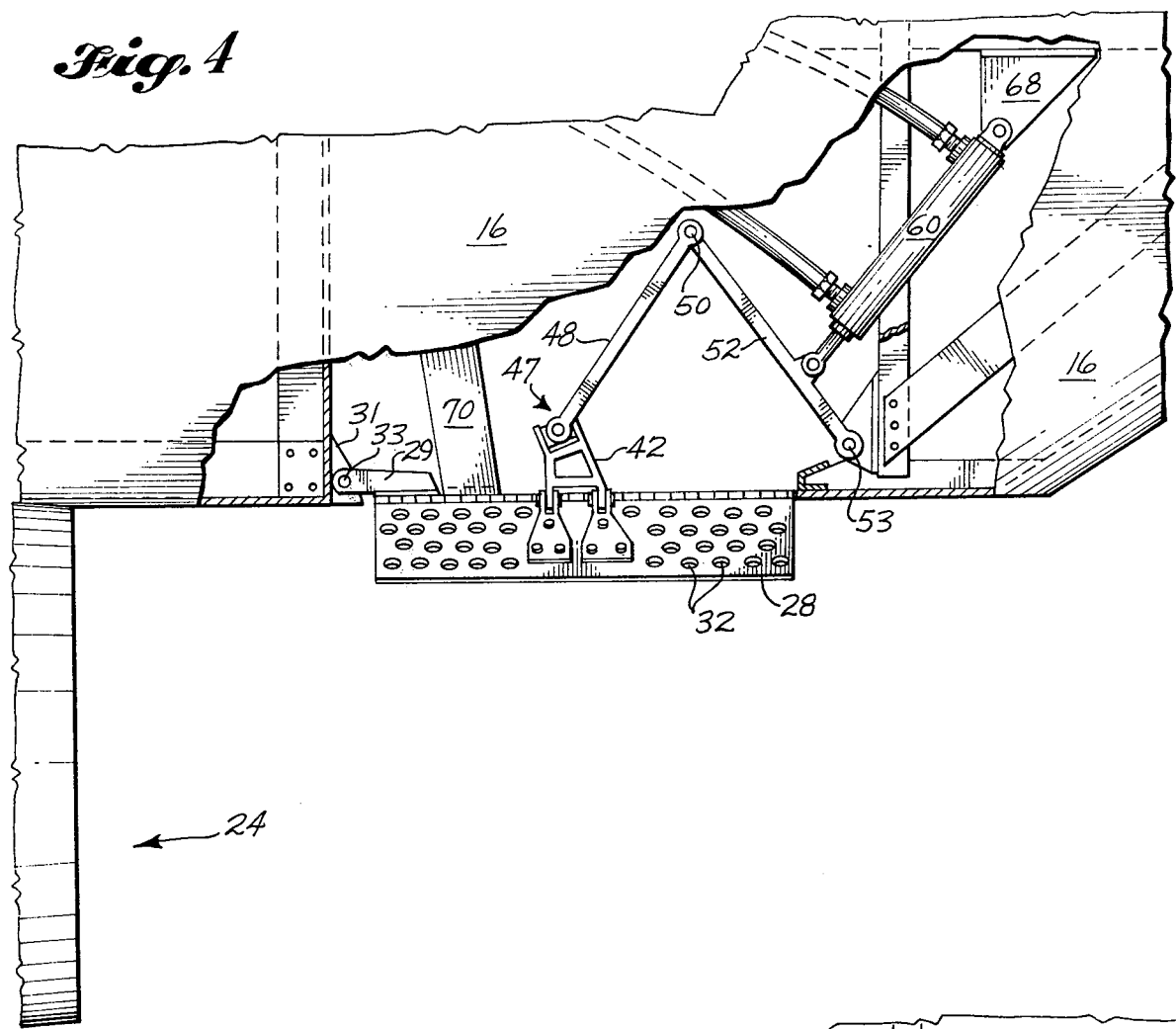
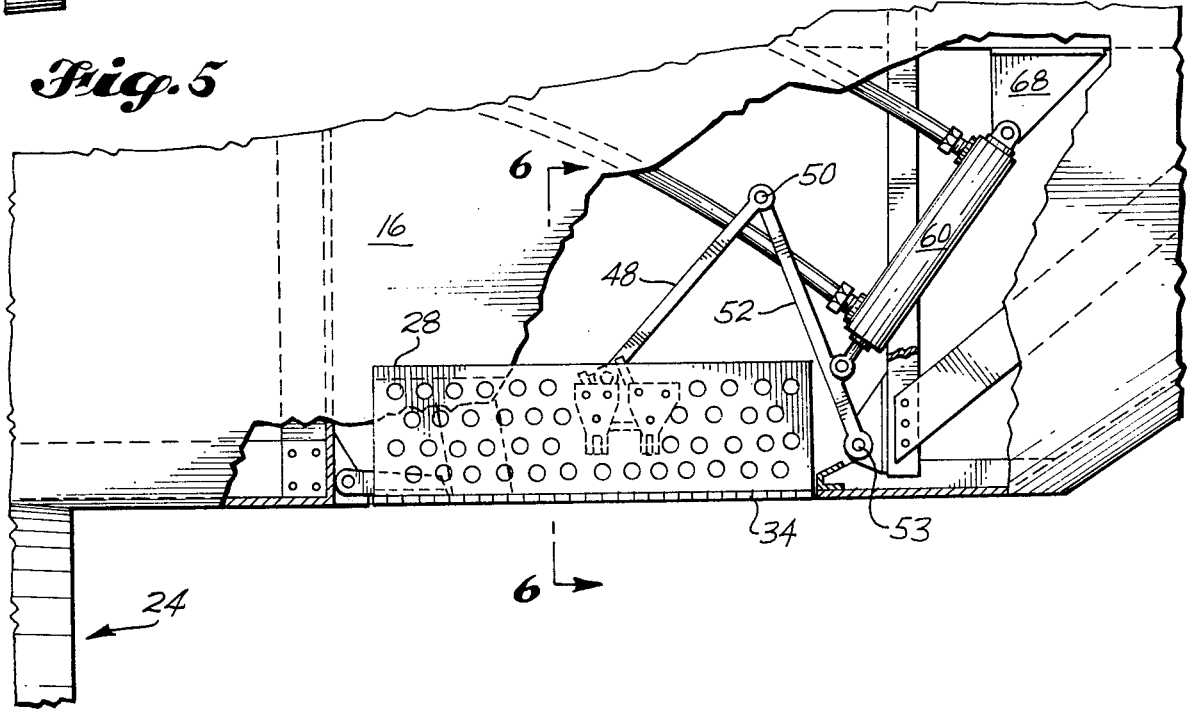

001
SIMPLIFIED CORE FLOW THRUST CONTROL DEVICE

BACKGROUND OF THE INVENTION

1. Field of the Invention

This invention relates broadly to the field of thrust control devices for use with jet engines. More particularly, this invention relates to those thrust control devices intended to spoil and/or deflect the hot core exhaust flow. Although this invention finds particular utility in the field of turbofan engines, it is clear that the advantages of the invention are equally well manifest in other engine applications wherever low cost, reliable thrust spoiling is required. The invention is useful not only upon landing, but also during taxiing where relatively high engine speeds may be required to keep the engine lit.

2. Background of the Invention

Various arrangements for spoiling and/or deflecting the thrust of a jet engine are known. These devices, frequently termed thrust reversers, are either mounted within the engine itself or are mounted on some portion of the aircraft frame adjacent the engine. Because of their constant exposure to the high temperature environment of the engine, devices of the former type require high cost, high temperature-tolerant materials. As a result, maintenance costs are high. On turbofan installations where separate, fan-only reversers are available, the core flow reversers are frequently not used. Since forward core thrust is subtracted from fan-only reverse thrust, only about 21-24% total retarding force is generated using a maximum efficiency fan-only reverser delivering 45% or more reverse thrust. Use of maximum efficiency fan-only reversers may not be practical since such devices are subject to reingestion of flow turbulence at aircraft speeds below about 60-70 knots. In this situation total stopping distance may actually be reduced by providing a less efficient fan-only reverser that may be used down to about 30 knots without suffering reingestion difficulties. While this may be operationally adequate, undesirable brake and tire wear and associated maintenance and replacement costs result. Obviously, if a greater stopping force could be generated by the engines, e.g., by using a 30% fan-only reverser along with a core flow reverser, the brake use necessary to stop the aircraft would be reduced. Since most core flow reversers are mounted within the engine, they cannot be easily removed even if they are not being used, which adds unnecessary dead weight to the aircraft. Devices of the latter type, i.e., a spoiler or deflector mounted downstream of the nozzle exit plane, have apparently found their greatest utility in the field of V/STOL aircraft. These devices are generally complex arrangements of deflecting vanes mounted in a retractable frame to properly orient the thrust for optimum short take-off and landing performance. As a result, they are frequently quite bulky and require relatively complex operating mechanisms for the vanes, which renders compact stowage difficult. Additionally, apparently none of these devices are intended to affect only the hot core exhaust flow.

It is, accordingly, an object of the present invention to provide a simple, lightweight and easily installed thrust control device which overcomes these and other limitations and disadvantages of the prior art.

It is another object to provide a thrust control device that may be easily adapted for a variety of engine installations.

It is a further object of the invention to provide a thrust control device that is actuated in a novel manner to permit compact stowage when not in use.

It is yet another object of the invention to provide a thrust control device that affects only the hot exhaust core flow.

It is another object to provide a thrust control device that may be easily modified and adapted to provide the optimum amount of thrust deflection and spoiling for a particular installation.

It is still another object to provide a thrust controller designed and mounted to cool the mounting hardware during thrust spoiling.

SUMMARY OF THE INVENTION

Briefly, these and other objects are achieved in accordance with the structural aspects of an example of the invention in which a plurality of lightweight plates are pivotally mounted to each other and are actuated through a linkage arrangement that is pivotally attached to particular plates at a location offset from their pivotal connection to each other. This simple arrangement not only permits the relative plate angles to be easily modified, but also provides a mechanical movement of the plates about their respective pivots that permits compact stowage of the device when not in use. Simplicity of design, light weight and low cost also permit the inventive spoiler to be easily retrofitted to existing engine installations.

Further details of these and other novel features, their operation and cooperation as well as additional objects and advantages of the invention will become apparent and be best understood from a consideration of the following description taken in connection with the accompanying drawing, which is provided by way of illustrative example only.

BRIEF DESCRIPTION OF THE DRAWING

FIG. 1 is a view of a typical installation utilizing the invention.

FIG. 2 is a side view of the controller and actuator in its extended, operative position.

FIG. 3 is a top, sectional view along line 3—3 of FIG. 2.

FIG. 4 is a view similar to FIG. 2 showing the control device as it retracts.

FIG. 5 is a view similar to FIG. 2 showing the control device in a fully retracted and stowed position.

FIG. 6 is a sectional view along lines 6—6 of FIG. 5.

DETAILED DESCRIPTION OF THE PREFERRED EMBODIMENT

With specific reference to the figures. in detail, it is stressed that the particulars shown are by way of example and for purposes of illustrative discussion only. Specifically, this detailed showing is not to be taken as a limitation upon the scope of the invention, which is defined by the appended claims forming, along with the drawing, a part of this specification.

In FIG. 1 the general environment in which the invention finds particular utility is shown. A turbofan engine, generally designated 10, is suspended beneath an airfoil 12 by a strut, generally designated 14. Strut 14 is surrounded by a conventional fairing 16, which has been modified by provision of a cutout portion 18 into which the controller of the invention, generally designated 20, may be retracted for compact stowage when not in use. As is conventional, engine 10 produces a fan flow from the general region designated 22 and a hot core exhaust flow from the general region designated 24. As is apparent from FIG. 1, when controller 20 is moved into its operative position, only the hot core flow from region 24, will be affected.

Turning now to FIGS. 2-3, controller 20 is formed by a blocker structure, generally designated 25, and an actuator linkage, generally designated 27. Blocker structure 25 is formed by three plates in the preferred embodiment. A main plate 26 is oriented in a plane generally perpendicular to the direction of core exhaust flow while a pair of side plates 28, 30 are arranged at an angle thereto. Each plate of blocker 25 may be provided with a plurality of holes or slots 32 therethrough, which function to break up the hot core exhaust flow and thereby spoil the thrust. The remainder of the surface of each plate 26, 28, 30 serves to deflect the core flow, thereby reversing the thrust. The angle through which the flow is deflected will be discussed in greater detail infra. Plate 26 is pivotally connected at its opposite side edges to each side plate 28, 30 by a pivot 34. Secured to, or integral with, the rear surface of main plate 26, i.e., that surface facing away from the exhaust flow, is a flange 29 which is pivotally mounted to a fixed bracket 31 by a pivot 33. Attached to, or integral with the rear surface of each side plate 28, 30 is a pair of flanges 36. Each flange 36 is pivotally connected to an arm 40, provided on a first end of a yoke link 42, by a pivot 38. One such link 42 is provided for each side plate 28, 30. Yoke links 42 are pivotally connected to each other at their opposite, second ends by a pivot 44. Links 42 are also connected at their second ends to one end of a first actuator link 48 by a pivot 46. As shown in FIG. 2, the axes of pivots 44 and 46 are perpendicular and intersect to form a universal joint 47 between blocker 25 and actuator linkage 27. At its other end, link 48 is pivotally connected to one end of a second actuator link 52 by a pivot 50. Link 52 is pivotally connected at its other end to support flange 54 by a pivot 53. Flange 54 is fixedly connected to strut 14 in any conventional manner. Link 52 carries a boss 56 on one side thereof which provides a pivot connection 57 to a piston rod 58 of a conventional fluid actuator 60. Rod 58 is moved and controlled by passage of fluid through a pair of conduits 62 and 64, as is conventional. Actuator 60 is pivotally attached at 66 to a support flange 68 which is fixedly mounted to the aircraft in any convenient manner. A stop 69 is fixed to the frame (not shown in detail) of strut 14 and serves to stop actuator linkage 27 when it reaches a fully extended position. As shown in FIG. 2, actuator 60 is located well clear of the hot exhaust flow and along with actuator linkage 27, when in the fully extended, operative position, will be cooled by free stream and fan air thereby permitting use of less costly materials which reduces both material and maintenance costs.

The lengths of links 48, 52 may be selected to provide the optimum angular position of blocker 25 with respect to the core exhaust flow for a particular aircraft and engine application. Similarly the lengths of flanges 36 and links 42 may be selected to provide the optimum angle of deflection, and thereby reverse thrust, for a particular application. It is thus apparent that controller 20 may be utilized in a variety of engine and aircraft applications with simple modifications of relatively few elements.

Turning now to FIGS. 2, 4, 5 and 6, the simplified manner in which controller 20 may be retracted and compactly stowed will be described. From the fully extended position shown in FIG. 2, actuator 60 is operated to retract rod 58 which causes second actuator link 52 to move in a clockwise direction about pivot 53. As link 52 moves, it causes, through first actuator link 48, conterclockwise movement of blocker 25 about its pivot 33. This movement continues until main plate 26 contacts a frame member 70 of strut 14 and is stopped thereby in the position shown in FIG. 4. Because pivots 34 and 38 are spaced from one another (FIG. 3), continued retraction of rod 58 and linkage 27 causes side plates 28, 30 to move about pivots 34 and fold into their compact, stowed position within fairing 16, as shown in FIG. 5. Reversing these steps would extend blocker 25 to its operative position. If desired, retractable doors could be provided in fairing 16 to cover plates 28, 30 and provide a more streamlined surface.

Due to the simplicity of design and light weight of about fifty pounds per engine an added safety feature is produced since the exhaust flow, fan air and free stream air would sufficient to prevent freefall to a deflecting position in the event of parts failure. The overcenter linkage arrangement also serves to reduce the chance of such a freefall. Since blocker 25 may be sized to engage only the exhaust core flow, should unexpected blocking occur, fan thrust would continue to be produced. The core flow controller and a conventional fan flow reverser may be actuated by a single control or by independent controls as desired, so long as the control arrangement selected is capable of retracting the controller in flight.

There has thus been disclosed and described a simple, easily mounted and modified core flow thrust spoiler/deflector which exhibits the advantages and achieves the objects set forth hereinabove.

Variations and modifications will occur to persons skilled in the art without departing from the spirit and scope of the invention. Accordingly, it is intended the appended claims cover all such variations and modifications.

What is claimed is:

1. A thrust control device for a jet engine comprising a blocker structure, said structure including a substantially flat, rectangular main plate having opposite lateral side edges and front and rear faces; a pair of substantially flat, rectangular side plates, each of said side plates having front and rear faces and being pivotally attached to a respective one of said side edges by a first pivot means, whereby the orientation of said side plates with respect to said main plate may be easily modified to provide an optimum amount of thrust control for a variety of installations and means for moving said blocker structure between an operative, thrust control position and an inoperative, retracted position, said means for moving comprising actuator linkage means pivotally attached to the rear face of each said side plate respectively by a second pivot means, said first pivot means and said second pivot means on each side plate being spaced from each other, whereby as said blocker structure is moved toward said inoperative, retracted position, said side plates fold away from said front face of said main plate about the respective first pivot means for compact stowage, means to stop said main plate such that as said blocker structure is moved to said retracted position and said main plate reaches said stop means said side plates are folded about said first pivot means for said compact stowage.

2. A thrust control device as claimed in claim 1, further including a third pivot means attached to said main plate for permitting said blocker structure to be moved pivotally between said operative and inoperative positions.

3. A thrust control device as claimed in claim 2 further including an engine strut for mounting a jet engine, a strut fairing surrounding said strut, said third pivot means being fixedly connected to said strut, said strut providing said stop means and a pair of cutouts in said fairing to accomodate said side plates, whereby, as said side plates are pivoted for stowage, they are retracted into said cutouts.

4. A thrust control device as claimed in claim 1 wherein at least one of said plates has fluid passage means provided therethrough for spoiling thrust of a jet engine when said blocker structure is in said operative position.

5. A thrust control device as claimed in claim 1, said actuator linkage means comprising a pair of yoke links, one end of each yoke link being pivotally connected to one of said side plates by said second pivot means; the other ends of said yoke links being pivotally connected together by a fourth pivot means.

6. A thrust control device as claimed in claim 5, said actuator linkage means further comprising first and second actuator links pivotally connected together at one end thereof, the other end of said first actuator link being pivotally connected to said other ends of said yoke links by a fifth pivot means, the axes of rotation of said fourth and fifth pivot means lying in the same plane and being perpendicular to one another and the other end of said second actuator link being pivotally connected to a fixed flange.

7. A thrust control device as claimed in claim 6 wherein said means for moving further comprises actuator means pivotally attached to said actuator linkage means for moving same.

* * * * *